Figure 1:
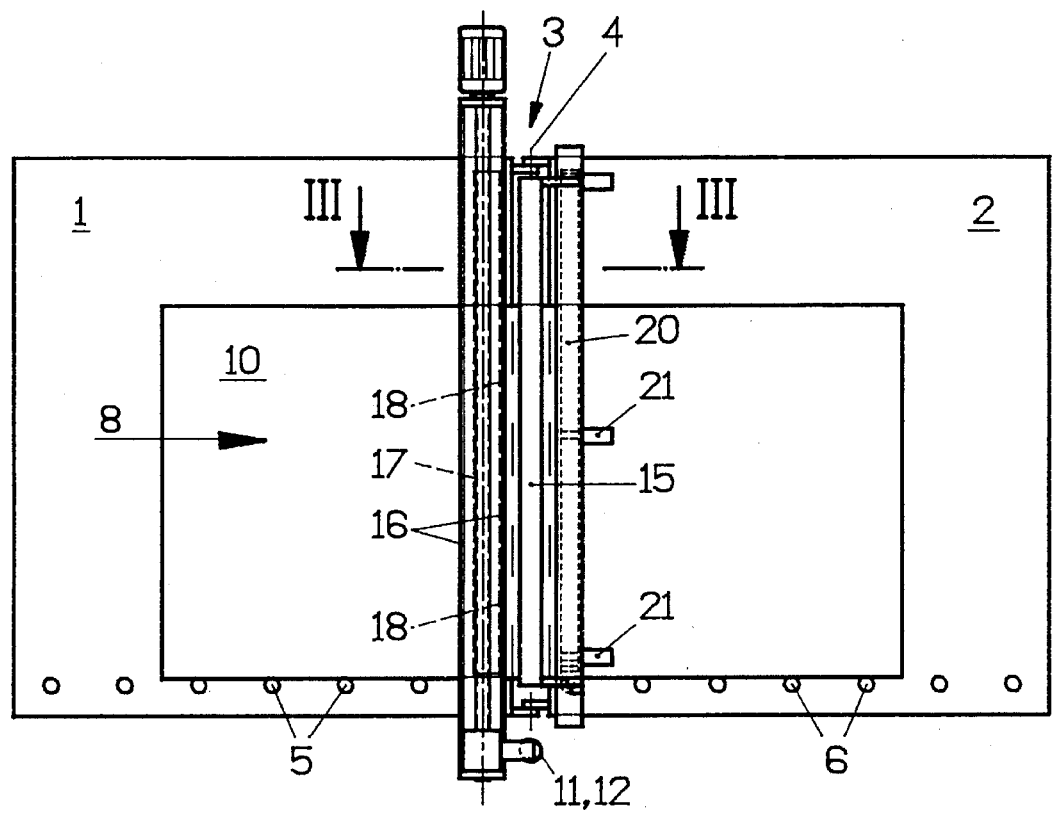

United States Patent [19]

Lisec

[11] Patent Number: 5,475,196
[45] Date of Patent: Dec. 12, 1995

[54] PROCESS AND APPARATUS TO CUT LAMINATED GLASS

[76] Inventor: Peter Lisec, Bahnhofstrasse 34, A-3363 Amstetten-Hausmening, Austria

[21] Appl. No.: 142,100

[22] Filed: Oct. 28, 1993

[30] Foreign Application Priority Data

Nov. 2, 1992 [AT] Austria .................... 2162/92

[51] Int. Cl.⁶ .......................... B23K 10/00; B23K 26/10
[52] U.S. Cl. ................. 219/121.39; 219/121.58; 219/121.67; 219/121.82; 225/93.5; 225/96.5; 83/455
[58] Field of Search ................ 219/121.37, 121.38, 219/121.39, 121.44, 121.55, 121.58, 121.66, 121.67, 121.69, 121.72, 121.82, 121.84; 225/2, 93.5, 96.5; 83/885, 455, 456; 65/105, 112, 113

[56] References Cited

U.S. PATENT DOCUMENTS

| | | | |
|---|---|---|---|
| 1,731,820 | 10/1929 | Lewis | 225/2 |
| 1,738,229 | 12/1929 | Campbell et al. | 225/2 |
| 3,679,863 | 7/1972 | Houldcroft et al. | 219/121.72 |
| 4,471,895 | 9/1984 | Lisec, Jr. | 225/2 |
| 4,552,290 | 11/1985 | Szostak | 225/2 |
| 4,558,622 | 12/1985 | Tausheck | 83/885 |
| 5,272,311 | 12/1993 | Gilli et al. | 219/121.67 |
| 5,297,710 | 3/1994 | Juras | 225/2 |

FOREIGN PATENT DOCUMENTS

| | | |
|---|---|---|
| 382260 | 2/1987 | Austria . |
| 2657757 | 6/1978 | Germany . |
| 200075 | 3/1983 | Germany . |
| 2000750 | 3/1983 | Germany . |
| 3230554 | 7/1984 | Germany . |
| 256667 | 5/1988 | Germany . |

*Primary Examiner*—Teresa J. Walberg
*Assistant Examiner*—Gregory L. Mills
*Attorney, Agent, or Firm*—Young & Thompson

[57] ABSTRACT

Laminated glass is grooved on both sides, bent first to one and then to the other side, and during the second bending process, the two parts of the laminated glass are pulled apart. The thus stretched film is melted by a plasma jet directed in the gap formed by the bending process, which is moved over the entire length of the gap. The apparatus to perform the process comprises two platelike supports (1, 2) for laminated glass (10) to be cut, of which at least one can swivel back and forth around an axis (4) running in impact area (3) between two supports (1, 2), and with clamping apparatuss to immobilize the laminated glass on the supports. On their lower edges, supports (1, 2) have conveying elements (5, 6) for laminated glass (10) and clamping apparatus (13, 14) to immobilize laminated glass (10). Further, a plasma torch (15) is provided, which has an outlet (30) for the plasma jet directed to impact area (3) between supports (1, 2), and the plasma torch is guided on a guide rail oriented parallel to the axis.

4 Claims, 2 Drawing Sheets

PROCESS AND APPARATUS TO CUT LAMINATED GLASS

The invention relates to a process to cut laminated glass, especially two-sheet laminated glass, in which the laminated glass is grooved on both sides, the laminated glass is bent first to one and then to the other side, the plastic film placed between the sheets of the laminated glass is stretched by the two parts of the laminated glass being pulled apart during or after the second bending process and finally the film being melted by heat input.

A process of the type mentioned above is known from DE-A-32 30 554. Since in this known process, the process step of pulling apart the two parts of the laminated glass is performed before the melting of the plastic film, namely during the second bending process, the splintering of the glass edges is prevented. On the other hand, the process of DE-A-32 30 554 makes it possible for the plastic film to be cut through quite satisfactorily and with clean cutting edge by the blast of heated air. But problems arise in the known process in so far as it is not simple to bring the volume of stored air quickly to the required high temperature (in DE-A-32 30 554, temperatures of 200° to 300° C. are mentioned) and to maintain this high temperature.

A drawback of the process known from DE-OS 32 30 554 and AT-PS 382 360 is that the air jet simultaneously expelled over the entire length of the gap cannot be concentrated exclusively in the area (gap) between the edges of the pulled-apart glass sheets, between which the plastic film is stretched. Invariably turbulences and a fanwise spreading of the blast of heated air occur, so that even the glass edges adjoining the gap are heated. This heating can reach the point where the plastic film is detached from the glass sheets and moisture can penetrate the laminated glass sheet so that the latter becomes milky. Moreover, the danger exists that microcracks unavoidably developing in the area of the groove lines in the glass sheets will become enlarged under the effect of the heating by the air blast and will form initial points for cracks in the glass sheets.

The object of the invention is to further develop the process of the generic type so that the film is uniformly and quickly melted over its entire length, without the areas of the glass sheets adjacent to the gap being noticeably heated.

In achieving this object, the invention consists in the fact that a jet of gas in the plasma state is directed to melt the film in the gap formed by the pulling-apart of the two parts of the laminated glass, that the jet of gas in the plasma state is moved from one end of the gap in its lengthwise direction up to its other end and that the jet of gas in the plasma state is concentrated and focused so that its periphery is placed at a distance from the edges of the two parts of the laminated glass which border the gap.

By using a plasma jet, it is no longer necessary to store heated air, so that the problems occurring with the known process according to DE-OS 32 30 554 are also avoided. In particular, it is prevented that parts of the apparatus are heated in an undesirable way and then the laminated glass is also thermally stressed. Thus, the danger of stress breaks is reduced.

A plasma jet further has the advantage that the amount of heat necessary for melting the film can be applied in a very short time, so that the plasma torch has to be put in operation only for a very short time and can be guided quickly along the gap crosswise over the laminated glass sheet.

By focusing the jet of gas in the plasma state according to the invention, the latter no longer touches the edges of the glass sheets bordering the gap, so that they are not heated (in practice, it has turned out that the latter are at most lukewarm—in earlier apparatus, the glass sheets were so hot on their edges that they could no longer be touched with bare hands), so that the danger of cracks on the one hand, and of detaching the glass sheets from the plastic film on the other hand and the creeping-in of moisture between the glass sheets, followed by the laminated glass sheets becoming milky, are no longer to be feared. Since the jet of gas in the plasma state, whose temperature in the core can be 10000° C. to 15000° C., can be so greatly focused that it does not touch the edges of the glass sheets, which border the gap, and by the possibility to move the jet of gas in the plasma state so quickly that only the film is heated, but not the glass edges, a further simplification and advantageous effect of the process according to the invention results.

The invention further relates to an apparatus to carry out the process with two platelike supports for the laminated glass to be cut, of which at least one can swivel back and forth around an axis running in the impact area between the two supports, and with clamping apparatus to immobilize the laminated glass on the supports. If the supports are oriented basically vertically, they exhibit conveying elements for the laminated glass on their lower edges.

According to the invention, this apparatus is characterized in that a plasma torch is provided, which exhibits an outlet for the plasma jet directed toward the impact area between the supports, and in that the plasma torch is guided on a guide rail oriented parallel to the axis.

In an alternative embodiment, the apparatus for carrying out the process with two platelike supports for the laminated glass to be cut, of which one can swivel back and forth around an axis running in the impact area between the two supports, and with apparatus to immobilize the laminated glass on the supports, which are placed on both sides of the impact area between the two supports, is characterized in that one of the two plates oriented basically horizontally is rigidly fastened to the machine frame, while the second plate is mounted to swivel up and down around an axis lying below the plates, placed in the impact area, and in addition in the direction of the plane of the stationary plate is movable crosswise to the latter, in that the plasma torch is guided on a guide rail oriented parallel to the axis.

Figure 2:
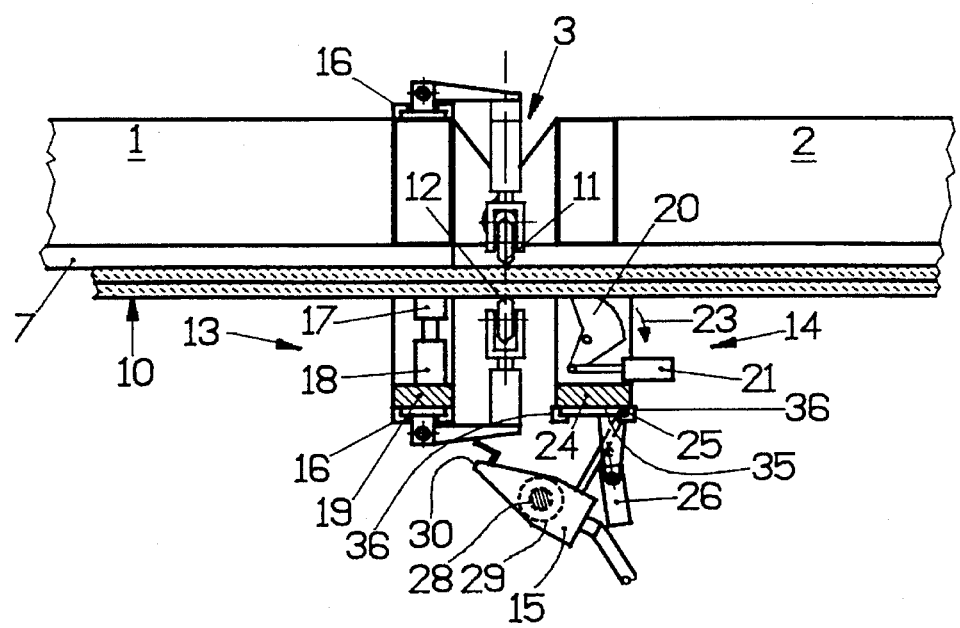
Figure 3:
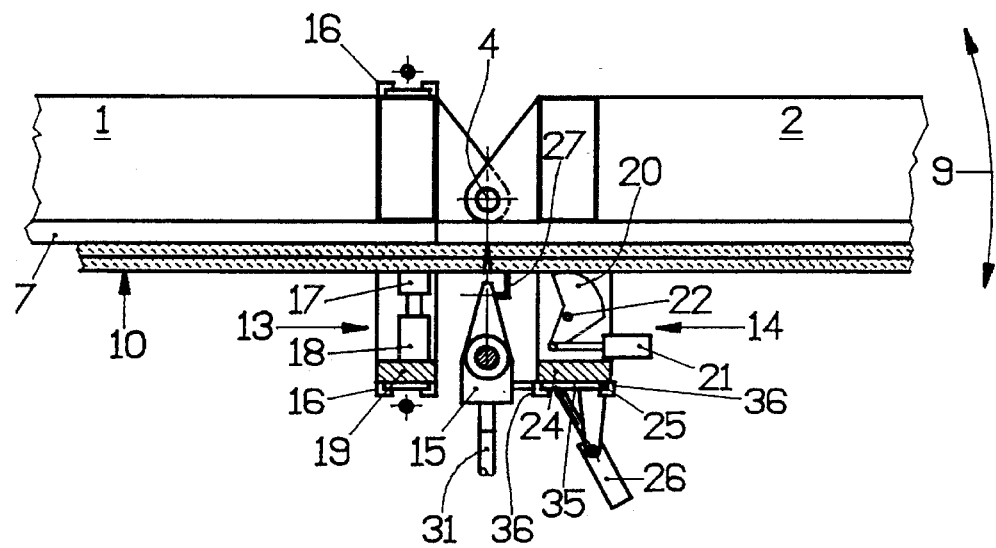
Figure 4:
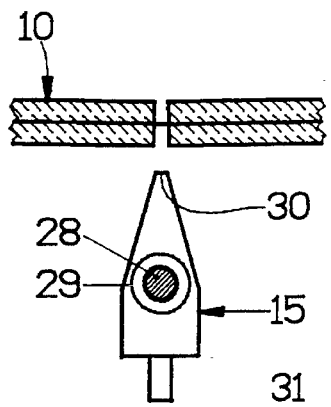
Figure 5:
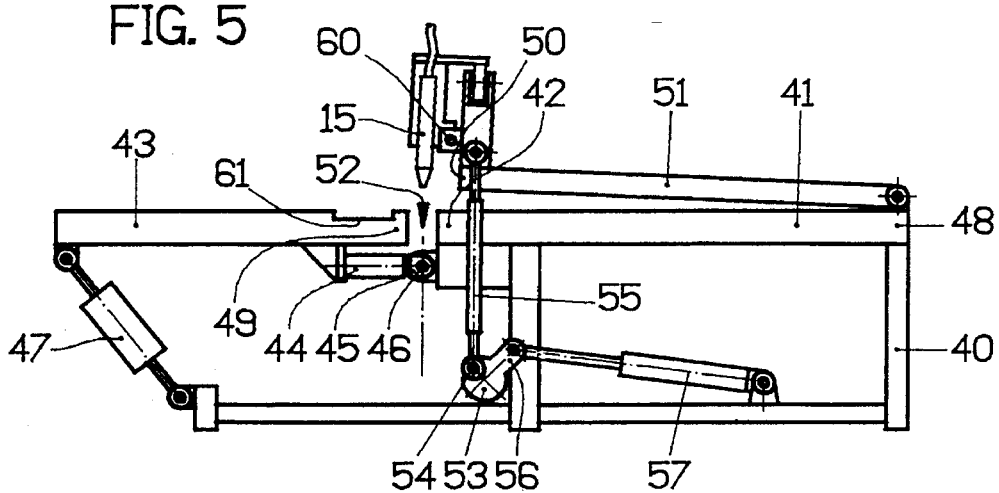

Further details and features of the invention follow from the following description of preferred embodiments of the process of the invention and of embodiments of apparatus according to the invention, in which reference is made to the drawings. There is shown in:

FIG. 1 an apparatus in plan view;

FIG. 2 a section along line III—III during the performance of the grooving work;

FIG. 3 a section along line III—III in FIG. 1 with the plasma torch pivoted in position;

FIG. 4 on an enlarged scale, the separating seam after the second bending process; and FIG. 5 another embodiment of the apparatus.

The apparatus to cut laminated glass sheets 10, especially two-sheet laminated glass sheets, has two platelike supports 1 and 2, which can swivel relative to one another around a basically vertical axis 4 running in impact area 3 between supports 1 and 2. In the shown embodiment, first platelike support 1 is placed immobilized in conveying direction (arrow 8), while second platelike support 2 can swivel around axis 4 in the direction of double arrow 9 in FIG. 3. Both supports 1 and 2 can be placed inclined toward the rear by a few degrees, basically perpendicular, and in this case have conveying apparatus in the form of conveying rollers 5 or 6, conveying belts or the like on their lower edges.

A laminated glass sheet 10 to be cut is conveyed, standing upright on conveying rollers 5 and laterally supported by platelike support 1, in the direction of arrow 8 into the apparatus.

The correct alignment of laminated glass sheet 10 relative to the cutting apparatus still to be explained is determined with the help of adjustable stops or scales or else by distance-measuring apparatus assigned to conveying rollers 5 and/or 6. Especially distance-measuring apparatus (incremental sensors) assigned to conveying rollers 5 and/or 6 make possible an extensive automation of the determination of the cutting site.

The front surfaces of supports 1 and 2 facing laminated glass sheet 10 are designed as perforated plates 7, in which an air cushion can be produced between plate 7 and laminated glass sheet 10. In this connection, compressed air can be fed to the openings, not shown, in plates 7. By the air cushion, a practically frictionless transport in the apparatus according to the invention is possible. But supports in the form of roller fields can also be used.

In impact area 3 between two supports 1 and 2, cutting tools 11 and 12, clamping apparatus 13 and 14 as well as a plasma torch 15 are provided.

Cutting tools 11 and 12 are guided on rails 16 and can be moved up and down in impact area 3 to groove laminated glass sheets 10. Cutting tools 11 and 12 are moved by spindle drives, as shown in the embodiment, but can also be movable by chain pulls or the like.

Clamping apparatus 13 assigned to support 1 comprises a clamping beam 17, which operates with the help of pressure medium cylinders 18, which are fastened to or supported on an auxiliary frame 19 rigidly connected with support 1, i.e., can be pressed against support 1 or a laminated glass sheet 10 lying on the latter.

Clamping apparatus 14 assigned to support 2 is designed as an eccentric beam 20, which can be swiveled by pressure medium cylinders 21 around an axis 22, not movable relative to support 2, into its operative position (arrow 23 in FIG. 2). By the special design of eccentric beam 20, the part of laminated glass 10 resting on support 2 is not only held on support 2, but in addition is stressed in the direction away from impact area 3 between supports 1 and 2.

In the embodiments shown, plasma torch 15 is movable parallel to impact area 3 between supports 1 and 2 by slide 35 on auxiliary frame 24 in guide rails 36 similar to guide rails 16. In this connection, a drive (spindle drive, chain pull, toothed belt or the like), not shown, is assigned to plasma torch 15. Further, plasma torch 15 can be swivelable around an axis 25, which is provided on slide 35 guided on auxiliary frame 24 rigidly connected with support 2 with the help of pressure medium cylinders 26 between the end positions shown in FIG. 2 and 3 (readiness position in FIG. 2, operative position in FIG. 3). Plasma torch 15 has a stop 27 provided on it, which, as FIG. 3 shows, assures the exact alignment of plasma torch 15 relative to laminated glass sheet 10. In plasma torch 15, apparatus 28 and 29 indicated only diagrammatically in FIG. 1 to 4 and known in the art, are provided, with which gas fed by a pipe 31 can be brought out in the plasma state. Such apparatus are, e.g., those which apply to the gas a high-frequency, electric field, or those which produce the plasma state by electric discharges or by photon emissions, e.g., from lasers. Further, the plasma state of the fed gas can be produced with the help of an electric arc.

On its front end, plasma torch 15 has an outlet 30, from which gas in the plasma state exits, preferably jetlike, and passes into the separating area to melt the plastic film connecting the individual sheets of laminated glass sheet 10. In this way, the plasma jet is regulated, so that it just touches the plastic film stretched in the area of the gap with its tip. Moreover, the plasma jet is focused so that it does not touch the edges of the parts adjacent to the gap between the two pans of the laminated glass sheet.

To increase the pretension produced by eccentric beam 20, provision can be made for conveying rollers 6 of support 2 to be able to be actuated independently of conveying rollers 5 of support 1, so that the pretension exerted by eccentric beam 20 is increased.

The holding of a laminated glass sheet 10 on supports 1 and 2 by clamping apparatus 13 and 14 can be assisted in that a vacuum is applied to the openings, not shown, in air-permeable plate 7, so that laminated glass sheet 10 is sucked against supports 1 and 2. In this way, it is assured that laminated glass sheet 10 rests immovably on supports 1 and 2.

The apparatus can also exhibit basically horizontal supports 1 and 2. Plasma torch 15 can be placed, as shown in FIGS. 1 to 3, with basically vertical supports 1 and 2, as shown in FIG. 1 to 3, as shown "in front of" or (not shown) "behind" supports 1 and 2. In the case of horizontal supports 1 and 2, plasma torch 15 can be placed "above" or "below" supports 1 and 2.

The just described apparatus operates as follows:

A laminated glass sheet 10 standing upright on conveying rollers 5 and by the air cushion adjacent to support 1 is conveyed in the direction of arrow 8 until the desired relative position to cutting tools 11 and 12 is achieved. In this phase, support 2 is located in the same plane as support 1. As soon as the desired end position is reached, laminated glass sheet 10 is immobilized by actuating clamping apparatus 13 and 14 and by applying partial vacuum to the openings in plate 7, whereupon cutting tools 11 and 12 are actuated to make grooves on both sides of laminated glass sheet 10.

After the grooving, laminated glass sheet 10 is first bent forward, in which support 2 is swiveled forward around axis 4 by a few degrees. After this first bending process, support 2 is moved backward around axis 4 to perform the second bending process. By the part of laminated glass sheet 10 lying on support 2 being stressed toward eccentric beam 20 and optionally by conveying rollers 6 in the sense of a movement away from the bending area (impact area 3), the position diagrammatically shown in FIG. 4 is achieved during the second bending process with stretched film in the gap between the pans of laminated glass sheet 10.

Even before the beginning of the second bending process, plasma torch 15 was pivoted into the position shown in FIG. 3 and optionally put in operation already after the pivoting of support 2 by 1° backward, so that gas in the plasma state exits from outlet 30. Now, plasma torch 15 is moved along the gap, so that by the plasma jet exiting from outlet 30, the film is melted over the entire length of the gap. Thus, it is possible to move plasma torch 15 so quickly that the film is already cut through over its entire length, when the second bending process (total swing 4°–5°) is completed.

After this, support 2 is pivoted forward again in its position aligned with support 1, and because of the pretension further described above, the glass edges no longer touch one another in the area of the just produced separating seam (cutting site), so that a damage of the glass edges (splintering) is avoided. By actuating conveying rollers 6 after disengaging eccentric beam 20 and the switching of suction air fed to the openings in plate 7 to compressed air, the cut piece of laminated glass 10 is conveyed away from the apparatus.

Because of the precise immobilization of the laminated glass sheet in the apparatus according to the invention, the latter also makes it possible for very narrow strips to be separated from laminated glass sheets.

In the embodiment of the apparatus according to the invention shown in FIG. 5, a support plate 41 mounted stationary in machine frame 40 is provided. Another support plate 43 movable in machine frame 40 is provided at a distance from lengthwise edge 42 of support plate 41. Other support plate 43 is mounted to swivel in machine frame 40. The mounting that can be swiveled comprises two pressure medium motors 44 mounted on the frame of other support plate 40, to whose piston rods 45 a pivot lug 46 each is fastened, which can be swiveled around the journal pins mounted stationary in machine frame 40. In a preferred embodiment, not shown, two pressure medium cylinders 44 and the journal pins are placed in the support plane of support plates 41 and 43, and the journal pins can also be placed in the area of edge 49 of movable support plate 43 adjacent to impact point 52.

A pressure medium motor 47 oriented obliquely to support plate 43, supported on machine frame 40, acts on the frame of other support plate 43, motor which is designed as a pressure medium cylinder effective in two directions, in which both parts of pressure medium cylinder 47 can be actuated independently of one another. By actuating pressure medium cylinder 47, second support plate 43 can be pivoted upward and downward relative to first support plate 41 around the axis formed by pin 5.

By actuating both pressure medium motors 44, which are mounted on the frame of movable support plate 43 on its edge 42 adjacent to rigid support plate 41, and whose piston rods 45 support pivot lugs 46 for the mounting of movable support plate 43, movable support plate 43 can be removed from rigid support plate 41.

On rigid support plate 41, a clamping beam 50 is provided for clamping immobilization of the laminated glass sheet to be divided. This clamping beam 50 is mounted on two levers 51, which are mounted to swivel in machine frame 40 on edge 48 of stationary support plate 41 lying removed from impact point 52 between the two plates 41, 43. Below stationary support plate 41 in impact area 52 of two support plates 41, 43, a shaft 53 rotatable around a horizontal axis is provided in machine frame 40. Shaft 53 has on its ends two trunnions 54, which are connected by slide rods 55 with the ends of clamping beam 50. To twist shaft 53 and thus to raise and lower clamping beam 50, two pressure medium cylinders 57 acting on lever arms 56, which are fastened to shaft 53, and supported with their other ends in machine frame 40 are provided.

On the side of clamping beam 50 facing impact point 52 between two plates 41, 43, a guide rail 60 is mounted, on which both a cutting tool 11, not shown, acting on the top side of the laminated glass sheet and plasma torch 15 are guided movably. Another cutting tool 12, also not shown in FIG. 5, is guided movably to groove the lower sheet of the laminated glass sheet on a guide rail provided on the edge of rigidly mounted support plate 41. Preferably, both grooving or curing tools 11, 12 are moved synchronously.

To be able to hold the part of the laminated glass sheet lying on movable support plate 43 on the latter, a number of suction apparatus 61 can be provided on its edge adjacent to impact point 52, or else a clamping beam 50 is provided, as it is also assigned to stationary support plate 41. A clamping beam 50 has the advantage that also more narrow strips can be separated from a laminated glass sheet than if the latter is held with suction apparatus.

By support plate 43 that can be swiveled in the apparatus shown in FIG. 5, the groove lines can be opened by swiveling support plate 43 upward and downward. By actuating both pressure medium cylinders 44 on the ends of support plate 43, the latter can be moved away from stationary support plate 41 with the part of the laminated glass sheet fixed on it, to form the gap between the two parts of the laminated glass sheet, in which the film connecting the glass sheets of the laminated glass sheet is stretched, so that the latter is ready for separating with the help of plasma torch 15.

Preferably, the laminated glass sheet is divided, so that first by swiveling support plate 43 upward, the groove line produced in its lower glass sheet is opened. Then, the upper glass sheet is broken by swiveling support plate 43 downward with simultaneous moving away of the movable support plate and the gap is opened. As a result, the splintering of the lower glass sheet of the laminated glass sheet can be prevented as in the embodiment shown in FIG. 1 to 4.

In summary, the invention can be represented, for example, as follows:

In a process to cut laminated glass, the laminated glass is grooved on both sides, bent first to one and then to the other side, and with the second bending process, the two parts of the laminated glass are pulled apart. The thus stretched film is melted by a plasma jet directed in the gap formed by the bending process, which is moved over the entire length of the gap.

The apparatus to perform the process has two platelike supports 41, 43 for laminated glass 10 to be cut, of which at least one can be swiveled back and forth around an axis 46 running in impact area 52 between two supports 41,43. The supports exhibit clamping apparatus 50, 61 to immobilize laminated glass sheet 10. Further, a plasma torch 15 is provided, which exhibits an outlet for gas in the plasma state (plasma jet) directed back to impact area 52 between supports 41,43, and which is movable parallel to impact area 53.

In the process and apparatus described the jet of gas in a plasma state can be replaced by a laser beam.

What is claimed is:

1. In an apparatus to cut laminated glass, comprising two platelike supports for a laminated glass sheet to be cut, of which one can swivel around an axis running in an impact area between said two supports, and structure to immobilize a laminated glass sheet on said supports, which are placed on both sides of said impact area between said two supports; the improvement wherein one of said two supports is oriented horizontally and is rigidly fastened in a frame of said apparatus, while a second support is mounted to swivel vertically around a horizontal axis disposed in said impact area, and in addition in a direction of a plane of said one support is movable perpendicularly to an edge of said one support disposed next to said impact area, and wherein a high energy beam source is guided on a guide rail oriented parallel to said axis, and wherein said second support is mounted to swivel on pivots in said frame fastened to piston rods of pressure medium cylinders, and wherein at least one pressure medium cylinder to pivot said second support vertically acts on the edge of said second support opposite said impact area.

2. Apparatus according to claim 1, wherein said one pressure medium cylinder is a double cylinder with piston rods extending outward from two sides.

3. In an apparatus to cut laminated glass, comprising two platelike supports for laminated glass to be cut, of which at least one can swivel back and forth around an axis running in an impact area between the two supports, and apparatus to immobilize laminated glass on said supports; the improvement wherein a high energy beam source is provided, which has an outlet for the beam source directed toward said impact area between said supports, and wherein the beam source is guided on a guide rail oriented parallel to said axis, and wherein the apparatus to immobilize the laminated glass sheet on said platelike supports is, on at least one of two plate-like supports, a clamping apparatus with a clamping beam to be lowered from above on said at least one platelike support, and wherein said clamping beam is mounted on levers which are mounted to swivel on an edge of said platelike support remote from said impact area.

4. Apparatus according to claim 3, wherein to actuate said clamping beam, trunnions mounted to swivel around a machine-frame-stationary axis are provided, which are coupled with a rod to said clamping beam.

* * * * *